(12) United States Patent
Boggs et al.

(10) Patent No.: US 6,192,035 B1
(45) Date of Patent: *Feb. 20, 2001

(54) INTELLIGENT CONCENTRATOR FOR MULTIPLE SPEED DATA COMMUNICATIONS SYSTEMS

(75) Inventors: Andrew Keith Boggs; Quy N. Hoang, both of Raleigh; Joe Jacobs, Chapel Hill; John Mark Mullen, Wake Forest; Challis Purrington, Raleigh; Laura A. Weaver, Durham, all of NC (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 08/900,204

(22) Filed: Jul. 24, 1997

Related U.S. Application Data

(63) Continuation of application No. 08/598,293, filed on Feb. 8, 1996.

(51) Int. Cl.[7] .................................................. H04L 12/42
(52) U.S. Cl. ............................ 370/252; 370/232; 370/465
(58) Field of Search ................................... 370/252, 434, 370/465, 468, 500, 406, 408, 401, 402, 404, 424, 230, 231, 232, 233, 234, 253

(56) References Cited

U.S. PATENT DOCUMENTS

| | | | |
|---|---|---|---|
| 4,700,344 | * 10/1987 | Kaino et al. | 370/94 |
| 5,208,831 | * 5/1993 | Ueno et al. | 375/220 |
| 5,365,513 | * 11/1994 | Copley et al. | 370/17 |
| 5,384,779 | * 1/1995 | Patrick et al. | 370/85.12 |
| 5,436,624 | * 7/1995 | Pearce et al. | 340/825.16 |
| 5,530,696 | * 6/1996 | Boggs et al. | 370/17 |

* cited by examiner

*Primary Examiner*—Ricky Ngo
(74) *Attorney, Agent, or Firm*—Joscelyn G. Cockburn

(57) ABSTRACT

An intelligent multistation access unit is provided having a transmission speed detection circuit for determining the data transmission speed of an attached device attempting to gain access to a node of a multiple transmission rate digital data communications network. The intelligent multistation access unit is comprised of a speed detect circuit, which indicates the data transmission speed of the attached device, a switching circuit which directs the attached device to the speed detect circuit until switched to allow the attached device access to the network node, and a processor that controls the switching circuit and which permits the attached device access to the node depending on the data transmission speed indication.

8 Claims, 2 Drawing Sheets

INTELLIGENT CONCENTRATOR FOR MULTIPLE SPEED DATA COMMUNICATIONS SYSTEMS

This is a divisional application of Ser. No. 08/598,293, filed Feb. 8, 1996.

BACKGROUND OF THE INVENTION

1. Technical Field

The present invention relates in general to digital data transmission systems, and more particularly to an intelligent multistation access unit having a transmission speed detection circuit for a multiple speed data transmission system.

2. Description of the Related Art

In digital data transmission systems, composite clock and data signals in binary form are transmitted over media such as wires or fiber optic cables from a transmission line transmitter to a transmission line receiver. The transmitter and the receiver in a data transmission system may each be a single computer or may each comprise a local area network (LAN) of computers.

An individual computer or station in a LAN may both send information to other stations in the LAN and receive information from other stations. The station inserts into the LAN when it desires to communicate with another station in the LAN, and detaches from the LAN when the communications are complete. If information received by a station is destined for a station further along the network, the receiving station must pass the information along the LAN to the next adjacent station, and so forth, until the information reaches its final destination.

The signal received by a particular station in the LAN is represented by pulses in a data stream defined by positive-going and negative-going transitions. The transmitting station in the LAN outputs the data signal at a predetermined frequency. The binary data waveform, however, is degraded with respect to its phase and frequency as it propagates along the LAN transmission media due to electrical noise and dispersion. This degradation of bits in the binary waveform could result in incorrect interpretations by the receiving station of bits sent by the transmitter station across the LAN transmission media.

To prevent incorrect interpretation of data bits sent across stations in the LAN, the receiving station must reconstruct the received signal, regardless of electrical noise and transmission media degradations. Such reconstruction can be achieved by sampling the received signal at a regular rate equal to the transmitted bit rate, and at each sample instant making a decision of the most probable symbol being transmitted. Typically, a threshold level is chosen to which the received signal is compared. Transitions above and below this level are deemed to be binary ones or zeros, depending on the type of encoding of the signal.

In addition to reconstructing received data signals prior to retransmission to adjacent stations in the LAN, any new information which the station outputs to the LAN must be transmitted at the same frequency as that at which the LAN is operating. Because some LANs are capable of operating at different speeds, individual computers or stations in the LAN must be matched to the speed at which the LAN will be operating. Typically, the individual stations are programmed to the speed at which the LAN is to be operated. If the speed of the LAN is to change, the LAN must be taken down, and all the stations must be reprogrammed to the new speed at which the LAN will be operating. If a particular station is programmed to a speed of operation which is different than the speed at which the LAN is operating, any attempt by the station to attach to the LAN will result in bringing the LAN down.

A common LAN topology is the "token ring" network. The token ring is used to interconnect the devices attached to the network. The token ring network allows unidirectional data transmission between stations in a ring-like circuit, by a token passing procedure. The ring topology permits tokens to be passed from a node associated with a particular attached device, such as a personal computer, to another node in the ring. A node that is ready to send data can capture the token and thereafter insert data for transmission. A device or computer station attempting to gain access to a node of the token ring will have a token adapter which is physically connected to the token ring. This accessing device must carry out a procedure following a standard protocol in order to access the token ring.

Many LANs employ concentrators, or hubs, to connect many stations at a single network node. These multistation access units connect individually with each station along a 4-wire cable called a lobe. Multiple lobes extend out from a concentrator to individual stations to form a star-like structure. Physically, each station is individually attached to the concentrator through its lobe, where it may access the network node. When the concentrator is connected to a token ring network, the logical configuration of the network places each station connected to the concentrator at a separate node within the ring. A concentrator can individually connect the attached devices in a token ring, or it may be connected with other concentrators to form a larger token ring comprised of all the devices attached to all concentrators. An intelligent concentrator is one which includes processor controlled switching electronics for controlling access to the network.

One type of token ring product has two data transmission speeds, 4 Mbps and 16 Mbps. Both of the transfer speeds are frequently used, and often, the data transmission speed of 4 Mbps may be used in one network, while the data transmission speed of 16 Mbps may be used in another network, both of which a user may wish to access.

The speed of all devices inserted in the token ring must be the same for the ring to operate properly. Unfortunately, the end user of the accessing device may have no way of knowing the ring speed of the particular token ring he is attempting to access. If this user tries to insert onto the ring at the wrong speed, his station will cause the entire ring to go into a beacon state in which all data transmission is halted until the station is removed from the ring. This time can range from several milliseconds to 20 seconds depending on the wiring concentrator used. In addition, some non-token ring devices can be accidentally connected to a network node to cause complete failure of the ring until that device is found and manually removed.

The prior art has solved this problem of accessing multiple transmission rate networks by providing network adapters, for placement in computer workstations, which are able to detect the transmission speed of the ring and then configure the adapter to transmit at the proper rate. However, in order for the adapter's speed detect circuitry to determine the ring speed, the adapter must insert itself on the ring and sample data transmissions. Such speed detection inherently interferes with the data transmission on the ring, and further, may send the entire ring into a beacon state. Such disruptions in the data communication reduces network performance. Also, such schemes require complex clock extraction and data regeneration logic to implement. Moreover, these prior art schemes deny the token ring any facility for preventing insertion of a non-token ring device into the network, which will cause complete failure of the ring.

It would therefore be desirable to provide a system and method for inserting a device into a multiple transmission rate digital data communications network at the proper transmission speed without disrupting data flow in the network. It would be further desirable to provide a system and method of preventing non-network devices from inserting into the ring and disrupting data flow.

SUMMARY OF THE INVENTION

An intelligent multistation access unit is provided having a transmission speed detection circuit for determining the data transmission speed of an attached device attempting to gain access to a node of a multiple transmission rate digital data communications network. The intelligent multistation access unit is comprised of a speed detect circuit, which indicates the data transmission speed of the attached device, a switching circuit which directs signals from the attached device to the speed detect circuit until switched to allow the attached device access to the network node, and a processor that controls the switching circuit and which permits the attached device access to the node depending on the data transmission speed indication.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
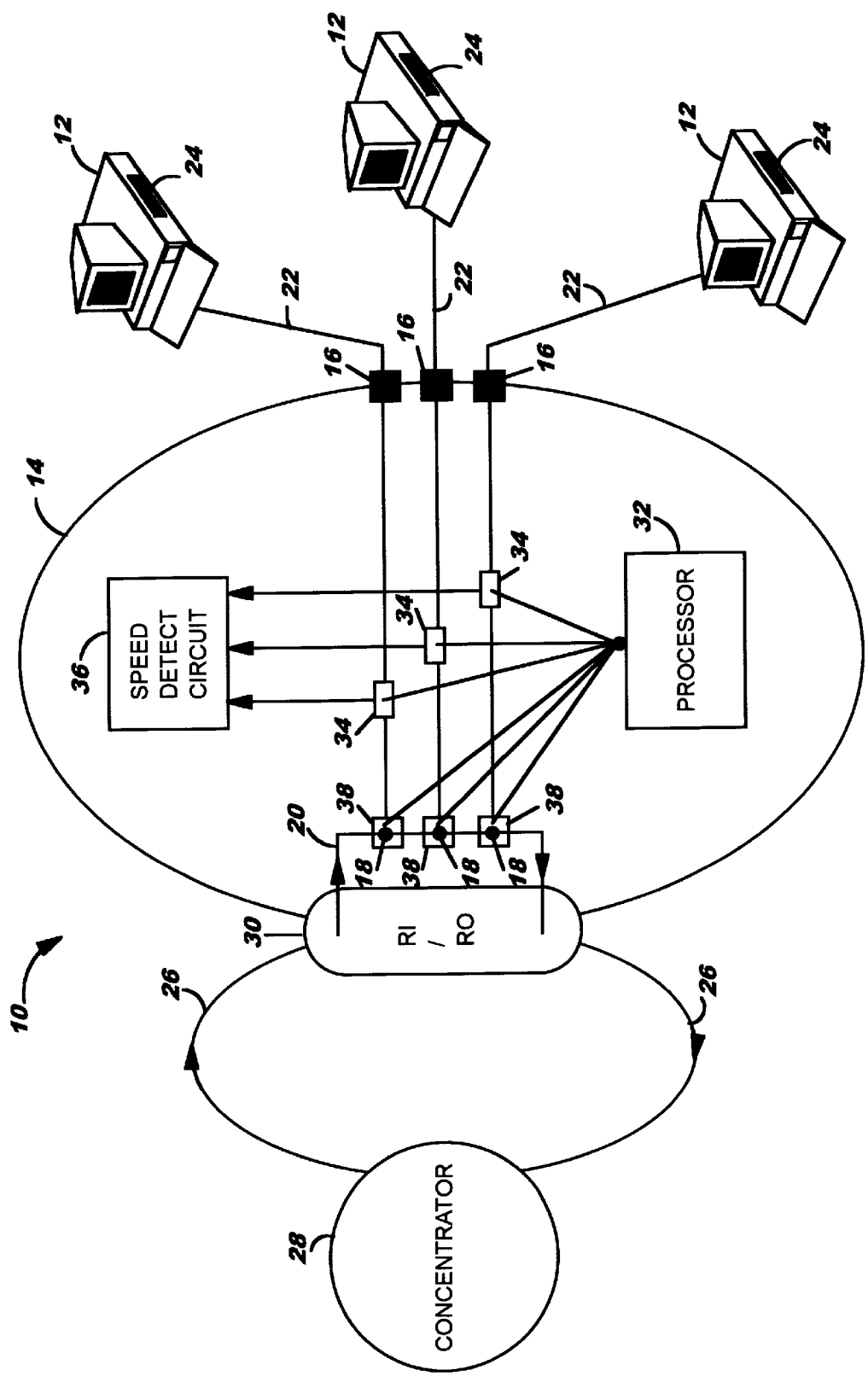
FIG. 1 depicts a token ring network connected by intelligent concentrators in accordance with a preferred embodiment of the present invention.

FIG. 1 shows a multiple rate digital data communication system 10 into which is incorporated the concentrator and speed detect circuit of the present invention. The system 10 comprises a local area network (LAN) which is formed by a plurality of attached devices or stations 12, such as personal computers or workstations. The stations 12 are connected to each other by concentrator 14. A concentrator can receive up to 80 attached devices, and can complete the network connection between the attached devices standing alone. A concentrator may also be attached to a main network connecting multiple concentrators to form a larger network over a greater geographic area.

Each station 12 is connected to a concentrator 14 at an attachment port 16 by a lobe 22, which is a transmission media such as a shielded twisted pair of copper wires. Concentrator 14 completes the physical connection between attachment ports 16 at nodes 18 along internal bus 20, so that an attached device 12 may communicate to other attached devices 12 via internal bus 20. Concentrator 14 is an intelligent concentrator having control logic and switching mechanisms to control the connection of stations 12 to nodes 18.

The particular attached device or station 12 is inserted into the network at a node 18 by means of a network adapter 24. The adapter 24 provides the mechanism by which each of the stations gains access to the network to send and receive data. The adapters 24 contain the hardware and/or software necessary to physically connect with and operate within the network.

The main ring 26 connects the concentrator 14 with multiple concentrators, such as the concentrator 28, that are serially connected along the ring network. The main ring may comprise a fiber optic cable or other type of known data transmission media, such as a shielded twisted pair of copper wires. Each concentrator may have up to 80 attached devices and is connected to the main ring 26 through a Ring-In/Ring-Out (RI/RO) device 30. The RI/RO device 30 connects main ring 1426 with the internal bus 20 to form a transmission circuit ring such that data travels in a clockwise direction around the token ring network. This enables stations inserted at a node 18 to communicate with not only the other stations 12 attached to internal bus 20, but also other stations and servers on the network that are attached to a different concentrator, such as concentrator 28.

In the preferred embodiment, a token ring topology is used to interconnect the attached devices or stations 12 within the LAN. The token ring network allows unidirectional data transmission between stations in a ring-like circuit by a token passing procedure. The ring topology permits tokens to be passed from a particular station 12 to another station 12 through nodes 18. A station 12 that is ready to send data can capture the token and thereafter insert data for transmission over the network.

The preferred token ring network is the IBM® Token-Ring network, which permits high-bandwidth peer-to-peer connectivity for the individual stations. The IBM® Token-Ring network may operate at a frequency of either 4 Mb/sec or 16 Mb/sec, and supports as many as 260 stations per ring. The IBM® Token-Ring network utilizes a differential Manchester code, which is a digital encoding technique wherein each bit period is divided into two complementary halves, to encode base band digital waveforms. A transition at the beginning of the bit period represents one of the binary digits "0" or "1", while the absence of a transition at the beginning of a bit period represents the other binary digit. It is intended, and it will be appreciated by those skilled in the art, that the present invention is not limited in application to the preferred embodiment of a token ring network, and that it may be utilized within any multiple speed digital data transmission system.

An attached device 12 attempting to gain access to the network begins its port insertion by entering a "Phase 0" of the adapter insertion process. During this phase, the network adapter 24 transmits frames to itself to determine if the lobe and transmit and receive circuitry is functioning properly. Therefore, during this phase, all frames are wrapped back to the adapter 24 by the relay 38 so that the adapter will receive exactly what it sends out over the lobe 22 if the link is good.

Once Phase 0 has completed, the network adapter 24 enters "Phase 1" by applying a phantom drive current to the lobe 22. The port 16 detects the current's presence and sends a phantom detect interrupt to the processor 32, which controls concentrator 14. This phantom detect interrupt identifies the lobe attempting to insert itself into the network.

The processor 32, unless otherwise directed by the network management system, switches a speed detect relay 34 connected in series with the port 16 connected with the station attempting to insert. By switching speed detect relay 34, processor 32 routes the data transmission signal from network adapter 24 to speed detect circuit 36.

Because the station 12 is unaware that it has been inserted into the speed detect circuit and not the ring, it proceeds with the token ring protocol necessary for insertion into the ring. First, the adapter 24 will insert a transition after sensing a burst_4_error (i.e. hearing silence for four bit times). Then after another bit time of silence, the adapter will begin transmitting idles. It is this transmission of idles that the speed detect circuit 36 locks in on to determine the accessing device's speed.

The concentrator processor 32 is notified of the accessing device's speed by the speed detect circuit 36. The concentrator processor 32 compares the accessing device's speed with the network speed which was preprogrammed into the concentrator processor, derived by detecting the main ring speed, or sensed from a switch setting. If the speeds match, the processor 32 deactivates the speed detect relay 34 and activates the port insert relay 38. An activated port insert relay 38 physically connects lobe 22 with node 18, thereby inserting station 12 into the token ring network. Once inserted on the ring at node 18, network adapter 24 proceeds with the remainder of the insertion phases until all token ring protocol requirements, such as verification of neighbor addresses, are satisfied.

If the speeds do not match, for example if station 12 were transmitting at 4 Mbps and the network speed was 16 Mbps, the processor 32 will not activate port insert relay 38 to let the device insert onto the network. In that case, the accessing device will continue to idle for a maximum of 18 seconds before the device will assume the link is bad and discontinue its attempt to insert.

Another feature of the present invention is that speed detect circuit 36 notifies the processor 32 when an attached device 12 is a non-network device. It is possible for a device to have the proper type of connector to connect to a lobe 22 or a port 16, and further, to impart a voltage on the same wire pairs as used by network devices such that the attached device looks like a network adaptor requesting insertion on the ring (i.e. applying a phantom voltage). When the attached device does not enter into idle as is expected from a token ring device, the processor 32 denies the device access to the ring, preventing a disruption of the data flow on the ring. For example, some video adapters use 9-pin Dshells, as do Token-Ring devices, which also impart a voltage on the same wire pairs as used by Token-Ring devices.

Figure 2:
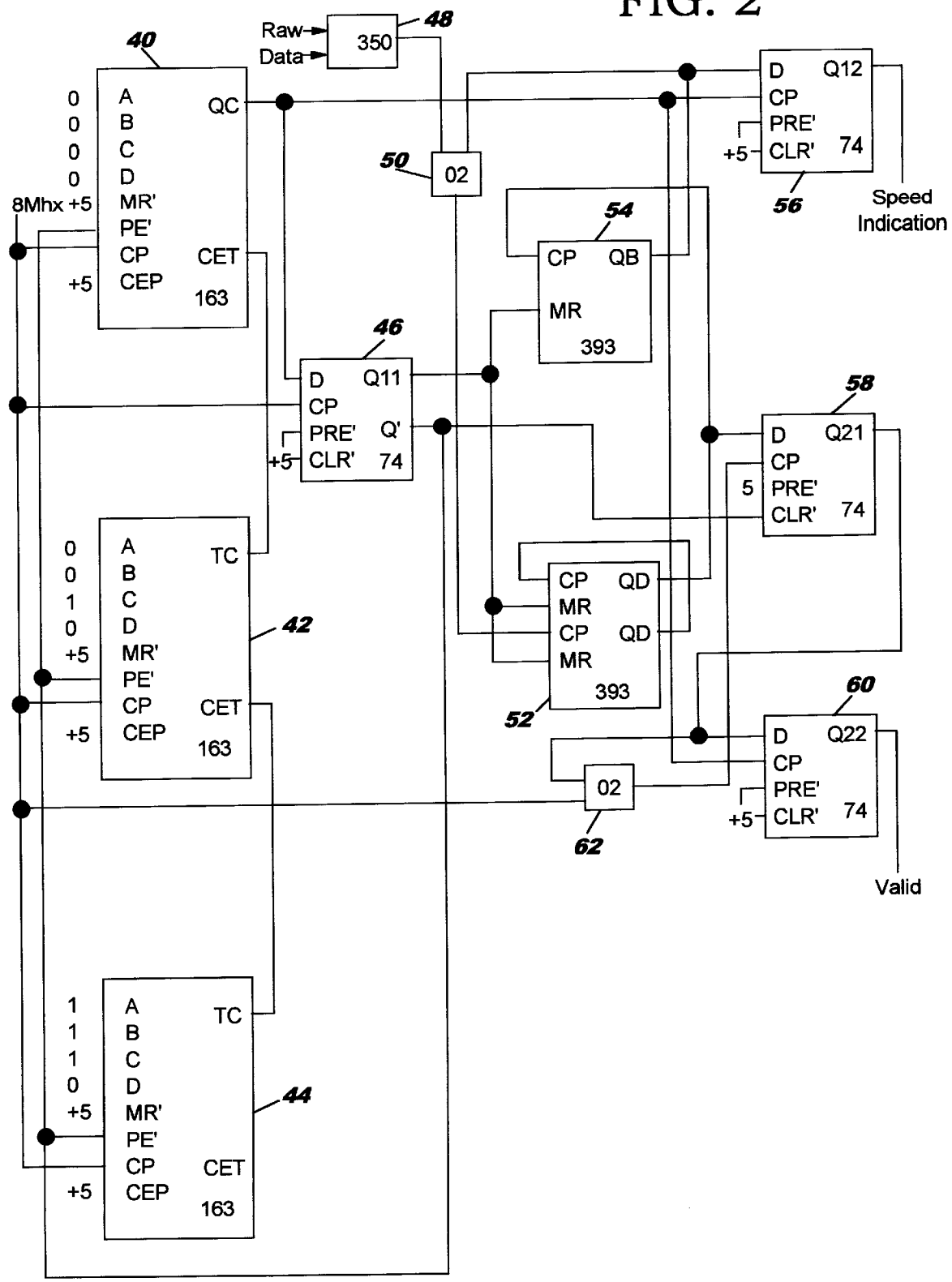
FIG. 2 is a schematic diagram of a speed detect circuit as described in a preferred embodiment of the present invention.

Referring now to FIG. 2, there is depicted a schematic diagram of the speed detect circuit 36 of a preferred embodiment of the present invention. Timer circuitry is implemented using the equivalent of a synchronous 11 bit counter. This is accomplished by ganging together three 4 bit counters, counters 40, 42 and 44, in series. An example of an appropriate counter for this application would be a model 74HC163 counter manufactured by Texas Instruments. These synchronous counters are clocked by an 8 MHz oscillator input at the clock pin CP.

As power is applied to the circuit, synchronous counter 44 begins counting from 0. On the sixteenth clock cycle, the counter 44 rolls over from its hexadecimal value of F. Its carry bit output from pin TC is received by a synchronous counter 42 at its Count Enable Carry Input (CET). Counters 44 and 42 continue to count until counter 42 has reached the end of its count and it carries its bit to CET of synchronous counter 40. The three ganged counters continue to count in this manner until the 8 Mhz clock has made 1024 transitions. At this point, the eleventh bit of the counter becomes active on the output pin QC of synchronous counter 40. Output pin QC is connected to the input of a D-latch 46, such as a 74HC74 manufactured by Texas Instruments. On the next clock cycle, the output of latch 46 becomes active. The complementary output Q' goes inactive and resets synchronous counters 40, 42, 44, whereupon the three counters are pre-loaded with a hexadecimal starting number, in this case 47. The timer free-runs from this point, recycling with a constant period. In this way, the synchronous counters 40, 42, 44 form a timer with a constant time period.

By adjusting the pre-load value input to the synchronous counters, any timing period desired may be produced. In the preferred embodiment, by starting with a pre-load value of decimal 47 the synchronous counter counts 977 transitions. The total transitions counted by the synchronous counter (977) divided by the input clock frequency (8 Mhz) derives a clock period of 122.1 microseconds.

A transition counter for counting transitions of the data signal input from the network adapter 24 is implemented by using the equivalent of a 10 bit asynchronous counter. The raw data differential signal routed from speed circuit relay 34 is fed into a translator 48. Translator 48 converts the differential signal to a TTL single-ended signal. For example, the translator may be a ECL to TTL translator, part number MC10H350 manufactured by Motorola. The translated data is then fed into a two input NOR gate 50 (such as a 74HC02). The output of NOR gate 50 is input into the clock pin CP of asynchronous counter 52.

When network adapter 24 is operating in idle mode, it is outputting a continuous stream of logical zeros, which produces a transition of the data signal for every clock cycle. Thus, the raw data clocks the asynchronous counter 52 with each rising edge until the timer rolls over and its carry bit is passed on to the input of asynchronous counter 54. Counters 52 and 54 operate together to form an asynchronous 10 bit counter.

With each timer period, latch 46 outputs an active signal for the duration of one clock cycle. This active signal is sent to the memory reset pins and clears the asynchronous counter 52, 54. Thus, the raw data clocks the asynchronous counter with each rising edge until the timer expires and the counter is cleared.

If the asynchronous counter 52, 54 is allowed to continue counting transitions during one timing period until the tenth bit of the counter becomes active, the asynchronous counter is stopped. The active tenth bit is input into NOR gate 50 which prevents further clocking of the asynchronous counter 52, 54.

Additionally, latch 56 latches this active bit and outputs it to the processor 32 over the speed indication line. An active signal on the speed indication line signifies that a threshold number of transitions of the raw data have been counted by the asynchronous counter during the timing period. When the threshold has been exceeded, the NOR gate 50 disables the raw data from continuing to clock the counters 52, 54 to prevent the counters from wrapping around within the current timing period and resulting in a false indication of speed. The active output from D-latch 56 occurs when the threshold has been exceeded, indicating a high speed transmission rate (16 Mbps). When the threshold has not been exceeded, the latch 56 output remains inactive, indicating a lower speed transmission rate (4 Mbps).

The threshold level for the counter, which is set at 512 transitions, is determined by computing the maximum number of transitions possible for a 4 Mbps station and the minimum number of transitions possible for a 16 Mbps station during a selected timing period and choosing a number in between. Then, by detecting whether the raw data output by the attached device exceeds the threshold number of transitions the transmission rate can be deduced. If it does not exceed the threshold, the attached device must be attempting to transmit at the lower transmission frequency of 4 Mbps. If it does exceed the threshold, it is transmitting at the upper level frequency of 16 Mbps.

The maximum number of transitions for a 4 Mbps transmission from a station would occur while the station was in idle. Thus the maximum is 4 Mhz. During a timer period of 122.1 microseconds, this would produce 488.4 transitions. The minimum number of transitions that could be produced from a station transmitting at 16 Mbps would be when the station is transmitting the worst case data sequence of burst_4_error, followed by forced transition, followed by a detected transition, followed by another burst_4_error. This produces one detectable transition every 156 ns, or 782 transitions every 122.1 microseconds. By choosing a threshold in between these two numbers it would be physically impossible for a 4 Mbps transmission to attain the threshold, and yet, the worse case 16 Mbps transmission would always surpass the threshold. In the preferred embodiment, a threshold of 512 transitions was chosen.

The detect circuit of the present invention is also capable of determining whether an attached device is, in fact, a valid network device. When asynchronous counter 52 outputs a carry bit to counter 54, this active bit is latched by D-latch 58. This carry bit is the eighth bit of the 10 bit asynchronous counter 52, 54, and becomes active after 128 transitions have been detected within the timer period. This minimum threshold of 128 was chosen to correspond with a signal with a frequency of 1 Mhz, which is a worse case 4 Mbps adapter signal. If the counter reaches bit 8 during the timer period, then latch 58 outputs an active signal to indicate that the attached station is indeed a valid token ring device. This active bit is detected by D-latch 60 at the end of the timer period which outputs a valid device signal to the processor 32. The output of latch 58 is also input to NOR gate 62, thereby preventing any further transmission of the enable clock to the latch 58. This effectively latches the valid device output signal until latch 58 is cleared by latch 46 at the beginning of the next timing period.

The present invention as has been described in a preferred embodiment provides a method for inserting a device into a multiple transmission rate digital data communications network at the proper transmission speed without disrupting data flow in the network. A novel concentrator network hub contains switching circuitry and a speed detect circuit which verifies the transmission speed of an attached device attempting to insert into a network before allowing it access to the network. Further, the concentrator prevents non-network devices from inserting into the ring and disrupting data flow.

While the invention has been particularly shown and described with reference to a preferred embodiment, it will be understood by those skilled in the art that various changes in form and detail may be made therein without departing from the spirit and scope of the invention.

What is claimed is:

1. An intelligent multistation access unit for determining the data transmission speed of devices attached to ports of the multistation access unit and attempting to gain access to nodes of a digital data communications network, comprising:

a single speed detect circuit which indicates the data transmission speed for each of the attached devices;

at least one switching circuit which directs signals from at least one of the attached devices to the single speed detect circuit until said switching circuit is switched by control signals to allow the at least one attached device to transmit the signals to the network node; and a processor that controls the switching circuit via the control signals, and which permits the attached device to transmit the signals to the node if the data transmission speed indication matches the transmission rate of the network.

2. A method for detecting non-token-ring devices attempting to gain access to a digital token ring communications network comprising the steps of:

(a) selecting a timing period;

(b) counting the number of signal transitions made by data output from the network devices during the timing period; and (c) generating a valid signal indicating the network devices are token ring devices only if a predetermined number of signal transitions are counted within the timing period.

3. The method of claim 2 wherein the predetermined number of signal transitions is a function of signal frequencies generated by said network devices.

4. The method of claim 2 wherein the predetermined number includes 128.

5. The method of claim 2 further including the step of not generating the valid signal if the predetermined number of signal transitions is not counted.

6. A circuit arrangement for detecting non-token ring devices attempting to gain access to a token ring communications network comprising:

a first counter being clocked at a set rate by an internal clock and generating a period signal when a specific count is reached;

a first gated latch coupled to an output pin of said first counter for latching the period signal;

a second counter having a reset pin coupled to an output of the first gated latch and a clock pin for receiving signals representing data outputted by one of the network devices; and a second gated latch having a control input coupled to an output of the first gated latch; a data input coupled to an output of said second counter and an output for indicating if a threshold count has been reached during a previous period.

7. The circuit arrangement of claim 6 wherein the first counter includes a synchronous counter.

8. The circuit arrangement of claim 7 wherein the second counter includes an asynchronous counter.

* * * * *